United States Patent
Quanci et al.

(10) Patent No.: US 11,071,935 B2
(45) Date of Patent: Jul. 27, 2021

(54) PARTICULATE DETECTION FOR INDUSTRIAL FACILITIES, AND ASSOCIATED SYSTEMS AND METHODS

(71) Applicant: SUNCOKE TECHNOLOGY AND DEVELOPMENT LLC, Lisle, IL (US)

(72) Inventors: John Francis Quanci, Haddonfield, NJ (US); Daniel C. Charles, Bakerville, IL (US)

(73) Assignee: SUNCOKE TECHNOLOGY AND DEVELOPMENT LLC, Lisle, IL (US)

(*) Notice: Subject to any disclaimer, the term of this patent is extended or adjusted under 35 U.S.C. 154(b) by 0 days.

(21) Appl. No.: 16/729,157

(22) Filed: Dec. 27, 2019

(65) Prior Publication Data
US 2020/0206669 A1   Jul. 2, 2020

Related U.S. Application Data

(60) Provisional application No. 62/786,284, filed on Dec. 28, 2018.

(51) Int. Cl.
| | |
|---|---|
| B01D 46/00 | (2006.01) |
| C10B 31/06 | (2006.01) |
| G01N 15/08 | (2006.01) |
| G08B 21/18 | (2006.01) |
| G08B 7/06 | (2006.01) |

(52) U.S. Cl.
CPC ......... *B01D 46/0086* (2013.01); *C10B 31/06* (2013.01); *G01N 15/08* (2013.01); *G08B 7/06* (2013.01); *G08B 21/182* (2013.01); *B01D 2273/18* (2013.01); *G01N 2015/084* (2013.01)

(58) Field of Classification Search
None
See application file for complete search history.

(56) References Cited

U.S. PATENT DOCUMENTS

| | | | |
|---|---|---|---|
| 425,797 | A | 4/1890 | Hunt |
| 469,868 | A | 3/1892 | Osbourn |
| 845,719 | A | 2/1907 | Schniewind |
| 976,580 | A | 7/1909 | Krause |
| 1,140,798 | A | 5/1915 | Carpenter |

(Continued)

FOREIGN PATENT DOCUMENTS

| | | |
|---|---|---|
| CA | 1172895 | 8/1984 |
| CA | 2775992 | 5/2011 |

(Continued)

OTHER PUBLICATIONS

U.S. Appl. No. 16/428,014, filed May 31, 2019, Quanci et al.

(Continued)

*Primary Examiner* — Fekadeselassie Girma
(74) *Attorney, Agent, or Firm* — Perkins Coie LLP (57) ABSTRACT

Systems and methods for particle leak detection generally include a separation or collection device configured to filter particulate from a stream and a detection device downstream of the separation or collection device. The detection device can be positioned to detect particulate that passes the separation or collection device and can include a probe configured to detect the solid particles. The particle leak detection systems can be configured to be disposed on moveable systems, such as moveable systems in coke oven operations.

20 Claims, 5 Drawing Sheets

(56) References Cited

U.S. PATENT DOCUMENTS

| | | | |
|---|---|---|---|
| 1,424,777 A | 8/1922 | Schondeling |
| 1,430,027 A | 9/1922 | Plantinga |
| 1,486,401 A | 3/1924 | Van Ackeren |
| 1,530,995 A | 3/1925 | Geiger |
| 1,572,391 A | 2/1926 | Klaiber |
| 1,677,973 A | 7/1928 | Marquard |
| 1,705,039 A | 3/1929 | Thornhill |
| 1,721,813 A | 7/1929 | Geipert |
| 1,757,682 A | 5/1930 | Palm |
| 1,818,370 A | 8/1931 | Wine |
| 1,818,994 A | 8/1931 | Kreisinger |
| 1,830,951 A | 11/1931 | Lovett |
| 1,848,818 A | 3/1932 | Becker |
| 1,947,499 A | 2/1934 | Schrader et al. |
| 1,955,962 A | 4/1934 | Jones |
| 2,075,337 A | 3/1937 | Burnaugh |
| 2,141,035 A | 12/1938 | Daniels |
| 2,195,466 A | 4/1940 | Otto |
| 2,235,970 A | 3/1941 | Wilputte |
| 2,340,981 A | 2/1944 | Otto |
| 2,394,173 A | 2/1946 | Harris et al. |
| 2,424,012 A | 7/1947 | Bangham et al. |
| 2,641,575 A | 6/1953 | Otto |
| 2,649,978 A | 8/1953 | Such |
| 2,667,185 A | 1/1954 | Beavers |
| 2,723,725 A | 11/1955 | Keiffer |
| 2,756,842 A | 7/1956 | Chamberlin et al. |
| 2,813,708 A | 11/1957 | Frey |
| 2,827,424 A | 3/1958 | Homan |
| 2,873,816 A | 2/1959 | Emil et al. |
| 2,902,991 A | 9/1959 | Whitman |
| 2,907,698 A | 10/1959 | Schulz |
| 3,015,893 A | 1/1962 | McCreary |
| 3,033,764 A | 5/1962 | Hannes |
| 3,224,805 A | 12/1965 | Clyatt |
| 3,448,012 A | 6/1969 | Allred |
| 3,462,345 A | 8/1969 | Kernan |
| 3,511,030 A | 5/1970 | Brown et al. |
| 3,542,650 A | 11/1970 | Kulakov |
| 3,545,470 A | 12/1970 | Paton |
| 3,592,742 A | 7/1971 | Thompson |
| 3,616,408 A | 10/1971 | Hickam |
| 3,623,511 A | 11/1971 | Levin |
| 3,630,852 A | 12/1971 | Nashan et al. |
| 3,652,403 A | 3/1972 | Knappstein et al. |
| 3,676,305 A | 7/1972 | Cremer |
| 3,709,794 A | 1/1973 | Kinzler et al. |
| 3,710,551 A | 1/1973 | Sved |
| 3,746,626 A | 7/1973 | Morrison, Jr. |
| 3,748,235 A | 7/1973 | Pries |
| 3,784,034 A | 1/1974 | Thompson |
| 3,806,032 A | 4/1974 | Pries |
| 3,811,572 A | 5/1974 | Tatterson |
| 3,836,161 A | 10/1974 | Pries |
| 3,839,156 A | 10/1974 | Jakobie et al. |
| 3,844,900 A | 10/1974 | Schulte |
| 3,857,758 A | 12/1974 | Mole |
| 3,875,016 A | 4/1975 | Schmidt-Balve |
| 3,876,143 A | 4/1975 | Rossow et al. |
| 3,876,506 A | 4/1975 | Dix et al. |
| 3,878,053 A | 4/1975 | Hyde |
| 3,894,302 A | 7/1975 | Lasater |
| 3,897,312 A | 7/1975 | Armour et al. |
| 3,906,992 A | 9/1975 | Leach |
| 3,912,091 A | 10/1975 | Thompson |
| 3,912,597 A | 10/1975 | MacDonald |
| 3,917,458 A | 11/1975 | Polak |
| 3,928,144 A | 12/1975 | Jakimowicz |
| 3,930,961 A | 1/1976 | Sustarsic et al. |
| 3,933,443 A | 1/1976 | Lohrmann |
| 3,957,591 A | 5/1976 | Riecker |
| 3,959,084 A | 5/1976 | Price |
| 3,963,582 A | 6/1976 | Helm et al. |
| 3,969,191 A | 7/1976 | Bollenbach |
| 3,975,148 A | 8/1976 | Fukuda et al. |
| 3,984,289 A | 10/1976 | Sustarsic et al. |
| 4,004,702 A | 1/1977 | Szendroi |
| 4,004,983 A | 1/1977 | Pries |
| 4,025,395 A | 5/1977 | Ekholm et al. |
| 4,040,910 A | 8/1977 | Knappstein et al. |
| 4,045,056 A | 8/1977 | Kandakov et al. |
| 4,045,299 A | 8/1977 | McDonald |
| 4,059,885 A | 11/1977 | Oldengott |
| 4,067,462 A | 1/1978 | Thompson |
| 4,083,753 A | 4/1978 | Rogers et al. |
| 4,086,231 A | 4/1978 | Ikio |
| 4,093,245 A | 6/1978 | Connor |
| 4,100,033 A | 7/1978 | Holter |
| 4,100,491 A * | 7/1978 | Newman, Jr. ............ G01V 3/08 200/61.09 |
| 4,111,757 A | 9/1978 | Carimboli |
| 4,124,450 A | 11/1978 | MacDonald |
| 4,135,948 A | 1/1979 | Mertens et al. |
| 4,141,796 A | 2/1979 | Clark et al. |
| 4,145,195 A | 3/1979 | Knappstein et al. |
| 4,147,230 A | 4/1979 | Ormond et al. |
| 4,162,546 A | 7/1979 | Shortell et al. |
| 4,181,459 A | 1/1980 | Price |
| 4,189,272 A | 2/1980 | Gregor et al. |
| 4,194,951 A | 3/1980 | Pries |
| 4,196,053 A | 4/1980 | Grohmann |
| 4,211,608 A | 7/1980 | Kwasnoski et al. |
| 4,211,611 A | 7/1980 | Bocsanczy |
| 4,213,489 A | 7/1980 | Cain |
| 4,213,828 A | 7/1980 | Calderon |
| 4,222,748 A | 9/1980 | Argo et al. |
| 4,222,824 A | 9/1980 | Flockenhaus et al. |
| 4,224,109 A | 9/1980 | Flockenhaus et al. |
| 4,225,393 A | 9/1980 | Gregor et al. |
| 4,235,830 A | 11/1980 | Bennett et al. |
| 4,239,602 A | 12/1980 | La Bate |
| 4,248,671 A | 2/1981 | Belding |
| 4,249,997 A | 2/1981 | Schmitz |
| 4,263,099 A | 4/1981 | Porter |
| 4,268,360 A | 5/1981 | Tsuzuki et al. |
| 4,271,814 A | 6/1981 | Lister |
| 4,284,478 A | 8/1981 | Brommel |
| 4,285,772 A | 8/1981 | Kress |
| 4,287,024 A | 9/1981 | Thompson |
| 4,289,479 A | 9/1981 | Johnson |
| 4,289,584 A | 9/1981 | Chuss et al. |
| 4,289,585 A | 9/1981 | Wagener et al. |
| 4,296,938 A | 10/1981 | Offermann et al. |
| 4,299,666 A | 11/1981 | Ostmann |
| 4,302,935 A | 12/1981 | Cousimano |
| 4,303,615 A | 12/1981 | Jarmell et al. |
| 4,307,673 A | 12/1981 | Caughey |
| 4,314,787 A | 2/1982 | Kwasnik et al. |
| 4,324,568 A * | 4/1982 | Wilcox ............... B01D 46/0013 239/514 |
| 4,330,372 A | 5/1982 | Cairns et al. |
| 4,334,963 A | 6/1982 | Stog |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,344,822 A | 8/1982 | Schwartz et al. |
| 4,353,189 A | 10/1982 | Thiersch et al. |
| 4,366,029 A | 12/1982 | Bixby et al. |
| 4,373,244 A | 2/1983 | Mertens et al. |
| 4,375,388 A | 3/1983 | Hara et al. |
| 4,391,674 A | 7/1983 | Velmin et al. |
| 4,392,824 A | 7/1983 | Struck et al. |
| 4,394,217 A | 7/1983 | Holz et al. |
| 4,395,269 A | 7/1983 | Schuler |
| 4,396,394 A | 8/1983 | Li et al. |
| 4,396,461 A | 8/1983 | Neubaum et al. |
| 4,407,237 A | 10/1983 | Merritt |
| 4,421,070 A | 12/1983 | Sullivan |
| 4,431,484 A | 2/1984 | Weber et al. |
| 4,439,277 A | 3/1984 | Dix |
| 4,440,098 A | 4/1984 | Adams |
| 4,445,977 A | 5/1984 | Husher |
| 4,446,018 A | 5/1984 | Cerwick |

(56) References Cited

U.S. PATENT DOCUMENTS

| | | |
|---|---|---|
| 4,448,541 A | 5/1984 | Lucas |
| 4,452,749 A | 6/1984 | Kolvek et al. |
| 4,459,103 A | 7/1984 | Gieskieng |
| 4,469,446 A | 9/1984 | Goodboy |
| 4,474,344 A | 10/1984 | Bennett |
| 4,487,137 A | 12/1984 | Horvat et al. |
| 4,498,786 A | 2/1985 | Ruscheweyh |
| 4,506,025 A | 3/1985 | Kleeb et al. |
| 4,508,539 A | 4/1985 | Nakai |
| 4,527,488 A | 7/1985 | Lindgren |
| 4,564,420 A | 1/1986 | Spindeler et al. |
| 4,568,426 A | 2/1986 | Orlando |
| 4,570,670 A | 2/1986 | Johnson |
| 4,614,567 A | 9/1986 | Stahlherm et al. |
| 4,643,327 A | 2/1987 | Campbell |
| 4,645,513 A | 2/1987 | Kubota et al. |
| 4,655,193 A | 4/1987 | Blacket |
| 4,655,804 A | 4/1987 | Kercheval et al. |
| 4,666,675 A | 5/1987 | Parker et al. |
| 4,680,167 A | 7/1987 | Orlando |
| 4,690,689 A | 9/1987 | Malcosky et al. |
| 4,704,195 A | 11/1987 | Janicka et al. |
| 4,720,262 A | 1/1988 | Durr et al. |
| 4,724,976 A | 2/1988 | Lee |
| 4,726,465 A | 2/1988 | Kwasnik et al. |
| 4,732,652 A | 3/1988 | Durselen et al. |
| 4,793,981 A | 12/1988 | Doyle et al. |
| 4,824,614 A | 4/1989 | Jones et al. |
| 4,889,698 A | 12/1989 | Moller et al. |
| 4,919,170 A | 4/1990 | Kallinich et al. |
| 4,929,179 A | 5/1990 | Breidenbach et al. |
| 4,941,824 A | 7/1990 | Holter et al. |
| 5,052,922 A | 10/1991 | Stokman et al. |
| 5,062,925 A | 11/1991 | Durselen et al. |
| 5,078,822 A | 1/1992 | Hodges et al. |
| 5,087,328 A | 2/1992 | Wegerer et al. |
| 5,114,542 A | 5/1992 | Childress et al. |
| 5,213,138 A | 5/1993 | Presz |
| 5,227,106 A | 7/1993 | Kolvek |
| 5,228,955 A | 7/1993 | Westbrook, III |
| 5,234,601 A | 8/1993 | Janke et al. |
| 5,318,671 A | 6/1994 | Pruitt |
| 5,370,218 A | 12/1994 | Johnson et al. |
| 5,423,152 A | 6/1995 | Kolvek |
| 5,447,606 A | 9/1995 | Pruitt |
| 5,480,594 A | 1/1996 | Wilkerson et al. |
| 5,542,650 A | 8/1996 | Abel et al. |
| 5,622,280 A | 4/1997 | Mays et al. |
| 5,659,110 A | 8/1997 | Herden et al. |
| 5,670,025 A | 9/1997 | Baird |
| 5,687,768 A | 11/1997 | Albrecht et al. |
| 5,715,962 A | 2/1998 | McDonnell |
| 5,752,548 A | 5/1998 | Matsumoto et al. |
| 5,787,821 A | 8/1998 | Bhat et al. |
| 5,810,032 A | 9/1998 | Hong et al. |
| 5,816,210 A | 10/1998 | Yamaguchi |
| 5,857,308 A | 1/1999 | Dismore et al. |
| 5,913,448 A | 6/1999 | Mann et al. |
| 5,928,476 A | 7/1999 | Daniels |
| 5,966,886 A | 10/1999 | Di Loreto |
| 5,968,320 A | 10/1999 | Sprague |
| 6,017,214 A | 1/2000 | Sturgulewski |
| 6,059,932 A | 5/2000 | Sturgulewski |
| 6,139,692 A | 10/2000 | Tamura et al. |
| 6,152,668 A | 11/2000 | Knoch |
| 6,187,148 B1 | 2/2001 | Sturgulewski |
| 6,189,819 B1 | 2/2001 | Racine |
| 6,290,494 B1 | 9/2001 | Barkdoll |
| 6,412,221 B1 | 7/2002 | Emsbo |
| 6,596,128 B2 | 7/2003 | Westbrook |
| 6,626,984 B1 | 9/2003 | Taylor |
| 6,699,035 B2 | 3/2004 | Brooker |
| 6,758,875 B2 | 7/2004 | Reid et al. |
| 6,907,895 B2 | 6/2005 | Johnson et al. |
| 6,946,011 B2 | 9/2005 | Snyder |
| 6,964,236 B2 | 11/2005 | Schucker |
| 7,056,390 B2 | 6/2006 | Fratello |
| 7,077,892 B2 | 7/2006 | Lee |
| 7,314,060 B2 | 1/2008 | Chen et al. |
| 7,331,298 B2 | 2/2008 | Barkdoll et al. |
| 7,433,743 B2 | 10/2008 | Pistikopoulos et al. |
| 7,497,930 B2 | 3/2009 | Barkdoll et al. |
| 7,611,609 B1 | 11/2009 | Valia et al. |
| 7,644,711 B2 | 1/2010 | Creel |
| 7,722,843 B1 | 5/2010 | Srinivasachar |
| 7,727,307 B2 | 6/2010 | Winkler |
| 7,785,447 B2 | 8/2010 | Eatough et al. |
| 7,803,627 B2 | 9/2010 | Hodges et al. |
| 7,823,401 B2 | 11/2010 | Takeuchi et al. |
| 7,827,689 B2 | 11/2010 | Crane |
| 7,998,316 B2 | 8/2011 | Barkdoll |
| 8,071,060 B2 | 12/2011 | Ukai et al. |
| 8,079,751 B2 | 12/2011 | Kapila et al. |
| 8,080,088 B1 | 12/2011 | Srinivasachar |
| 8,146,376 B1* | 4/2012 | Williams ............... F24F 11/30 62/157 |
| 8,152,970 B2 | 4/2012 | Barkdoll et al. |
| 8,236,142 B2 | 8/2012 | Westbrook |
| 8,266,853 B2 | 9/2012 | Bloom et al. |
| 8,398,935 B2 | 3/2013 | Howell et al. |
| 8,409,405 B2 | 4/2013 | Kim et al. |
| 8,500,881 B2 | 8/2013 | Orita et al. |
| 8,515,508 B2* | 8/2013 | Kawamura .......... A61B 5/6861 600/316 |
| 8,647,476 B2 | 2/2014 | Kim et al. |
| 8,800,795 B2 | 8/2014 | Hwang |
| 8,956,995 B2 | 2/2015 | Masatsugu et al. |
| 8,980,063 B2 | 3/2015 | Kim et al. |
| 9,039,869 B2 | 5/2015 | Kim et al. |
| 9,057,023 B2 | 6/2015 | Reichelt et al. |
| 9,103,234 B2 | 8/2015 | Gu et al. |
| 9,193,915 B2 | 11/2015 | West et al. |
| 9,238,778 B2 | 1/2016 | Quanci et al. |
| 9,243,186 B2 | 1/2016 | Quanci et al. |
| 9,249,357 B2 | 2/2016 | Quanci et al. |
| 9,273,249 B2 | 3/2016 | Quanci et al. |
| 9,359,554 B2 | 6/2016 | Quanci et al. |
| 9,404,043 B2 | 8/2016 | Kim |
| 9,498,786 B2 | 11/2016 | Pearson |
| 9,580,656 B2 | 2/2017 | Quanci et al. |
| 9,672,499 B2 | 6/2017 | Quanci et al. |
| 9,708,542 B2 | 7/2017 | Quanci et al. |
| 9,862,888 B2 | 1/2018 | Quanci et al. |
| 9,976,089 B2 | 5/2018 | Quanci et al. |
| 10,016,714 B2 | 7/2018 | Quanci et al. |
| 10,041,002 B2 | 8/2018 | Quanci et al. |
| 10,047,295 B2 | 8/2018 | Chun et al. |
| 10,047,296 B2 | 8/2018 | Chun et al. |
| 10,053,627 B2 | 8/2018 | Sarpen et al. |
| 10,233,392 B2 | 3/2019 | Quanci et al. |
| 10,308,876 B2 | 6/2019 | Quanci et al. |
| 10,323,192 B2 | 6/2019 | Quanci et al. |
| 10,526,541 B2 | 1/2020 | West et al. |
| 10,578,521 B1* | 3/2020 | Dinakaran ............ G01N 1/2205 |
| 10,732,621 B2* | 8/2020 | Cella ................... G01M 13/045 |
| 2002/0170605 A1 | 11/2002 | Shiraishi et al. |
| 2003/0014954 A1 | 1/2003 | Ronning et al. |
| 2003/0015809 A1 | 1/2003 | Carson |
| 2003/0057083 A1 | 3/2003 | Eatough et al. |
| 2005/0087767 A1 | 4/2005 | Fitzgerald et al. |
| 2006/0102420 A1 | 5/2006 | Huber et al. |
| 2006/0149407 A1 | 7/2006 | Markham et al. |
| 2007/0087946 A1 | 4/2007 | Quest et al. |
| 2007/0116619 A1 | 5/2007 | Taylor et al. |
| 2007/0251198 A1 | 11/2007 | Witter |
| 2008/0028935 A1 | 2/2008 | Andersson |
| 2008/0179165 A1 | 7/2008 | Chen et al. |
| 2008/0257236 A1 | 10/2008 | Green |
| 2008/0271985 A1 | 11/2008 | Yamasaki |
| 2008/0289305 A1 | 11/2008 | Girondi |
| 2009/0007785 A1 | 1/2009 | Kimura et al. |
| 2009/0032385 A1 | 2/2009 | Engle |
| 2009/0152092 A1 | 6/2009 | Kim et al. |
| 2009/0162269 A1 | 6/2009 | Barger et al. |

(56) References Cited

U.S. PATENT DOCUMENTS

| | | |
|---|---|---|
| 2009/0217576 A1 | 9/2009 | Kim et al. |
| 2009/0257932 A1 | 10/2009 | Canari et al. |
| 2009/0283395 A1 | 11/2009 | Hippe |
| 2010/0095521 A1 | 4/2010 | Kartal et al. |
| 2010/0106310 A1 | 4/2010 | Grohman |
| 2010/0113266 A1 | 5/2010 | Abe et al. |
| 2010/0115912 A1 | 5/2010 | Worley |
| 2010/0119425 A1 | 5/2010 | Palmer |
| 2010/0181297 A1 | 7/2010 | Whysail |
| 2010/0196597 A1 | 8/2010 | Di Loreto |
| 2010/0276269 A1 | 11/2010 | Schuecker et al. |
| 2010/0287871 A1 | 11/2010 | Bloom et al. |
| 2010/0300867 A1 | 12/2010 | Kim et al. |
| 2010/0314234 A1 | 12/2010 | Knoch et al. |
| 2011/0000284 A1 | 1/2011 | Kumar et al. |
| 2011/0014406 A1 | 1/2011 | Coleman et al. |
| 2011/0048917 A1 | 3/2011 | Kim et al. |
| 2011/0088600 A1 | 4/2011 | McRae |
| 2011/0120852 A1 | 5/2011 | Kim |
| 2011/0144406 A1 | 6/2011 | Masatsugu et al. |
| 2011/0168482 A1 | 7/2011 | Merchant et al. |
| 2011/0174301 A1 | 7/2011 | Haydock et al. |
| 2011/0192395 A1 | 8/2011 | Kim |
| 2011/0198206 A1 | 8/2011 | Kim et al. |
| 2011/0223088 A1 | 9/2011 | Chang et al. |
| 2011/0253521 A1 | 10/2011 | Kim |
| 2011/0291827 A1 | 12/2011 | Baldocchi et al. |
| 2011/0313218 A1 | 12/2011 | Dana |
| 2011/0315538 A1 | 12/2011 | Kim et al. |
| 2012/0024688 A1 | 2/2012 | Barkdoll |
| 2012/0030998 A1 | 2/2012 | Barkdoll et al. |
| 2012/0031076 A1* | 2/2012 | Frank ............... F02D 41/029 60/274 |
| 2012/0125709 A1 | 5/2012 | Merchant et al. |
| 2012/0152720 A1 | 6/2012 | Reichelt et al. |
| 2012/0177541 A1 | 7/2012 | Mutsuda et al. |
| 2012/0180133 A1 | 7/2012 | Ai-Harbi et al. |
| 2012/0228115 A1 | 9/2012 | Westbrook |
| 2012/0247939 A1 | 10/2012 | Kim et al. |
| 2012/0305380 A1 | 12/2012 | Wang et al. |
| 2012/0312019 A1 | 12/2012 | Rechtman |
| 2013/0020781 A1 | 1/2013 | Kishikawa |
| 2013/0045149 A1 | 2/2013 | Miller |
| 2013/0216717 A1 | 8/2013 | Rago et al. |
| 2013/0220373 A1 | 8/2013 | Kim |
| 2013/0306462 A1 | 11/2013 | Kim et al. |
| 2014/0033917 A1 | 2/2014 | Rodgers et al. |
| 2014/0039833 A1 | 2/2014 | Sharpe, Jr. et al. |
| 2014/0061018 A1 | 3/2014 | Sarpen et al. |
| 2014/0083836 A1 | 3/2014 | Quanci et al. |
| 2014/0182195 A1 | 7/2014 | Quanci et al. |
| 2014/0182683 A1 | 7/2014 | Quanci et al. |
| 2014/0183023 A1 | 7/2014 | Quanci et al. |
| 2014/0208997 A1 | 7/2014 | Alferyev et al. |
| 2014/0224123 A1 | 8/2014 | Walters |
| 2014/0262139 A1 | 9/2014 | Choi et al. |
| 2014/0262726 A1 | 9/2014 | West et al. |
| 2015/0122629 A1 | 5/2015 | Freimuth et al. |
| 2015/0175433 A1 | 6/2015 | Micka et al. |
| 2015/0219530 A1 | 8/2015 | Li et al. |
| 2015/0247092 A1 | 9/2015 | Quanci et al. |
| 2015/0361346 A1 | 12/2015 | West et al. |
| 2015/0361347 A1 | 12/2015 | Ball et al. |
| 2016/0026193 A1 | 1/2016 | Rhodes et al. |
| 2016/0048139 A1 | 2/2016 | Samples et al. |
| 2016/0149944 A1 | 5/2016 | Obermeirer et al. |
| 2016/0154171 A1* | 6/2016 | Kato .................. F21V 5/00 362/606 |
| 2016/0186063 A1 | 6/2016 | Quanci et al. |
| 2016/0186064 A1 | 6/2016 | Quanci et al. |
| 2016/0186065 A1 | 6/2016 | Quanci et al. |
| 2016/0222297 A1 | 8/2016 | Choi et al. |
| 2016/0319197 A1 | 11/2016 | Quanci et al. |
| 2016/0319198 A1 | 11/2016 | Quanci et al. |
| 2017/0015908 A1 | 1/2017 | Quanci et al. |
| 2017/0182447 A1* | 6/2017 | Sappok ............. B01D 46/0086 |
| 2017/0183569 A1 | 6/2017 | Quanci et al. |
| 2017/0253803 A1 | 9/2017 | West et al. |
| 2017/0261417 A1* | 9/2017 | Zhang ............... G01M 15/102 |
| 2017/0352243 A1 | 12/2017 | Quanci et al. |
| 2018/0340122 A1 | 11/2018 | Crum et al. |
| 2019/0099708 A1 | 4/2019 | Quanci |
| 2019/0161682 A1 | 5/2019 | Quanci et al. |
| 2019/0169503 A1 | 6/2019 | Chun et al. |
| 2019/0317167 A1* | 10/2019 | Laborde ............ G01N 33/558 |
| 2019/0352568 A1 | 11/2019 | Quanci et al. |
| 2020/0071190 A1* | 3/2020 | Wiederin ................ C02F 1/42 |
| 2020/0139273 A1* | 5/2020 | Badiei ................ B01D 37/04 |
| 2020/0173679 A1* | 6/2020 | O'Reilly ................ F24F 11/38 |

FOREIGN PATENT DOCUMENTS

| | | |
|---|---|---|
| CA | 2822841 | 7/2012 |
| CA | 2822857 | 7/2012 |
| CN | 87212113 U | 6/1988 |
| CN | 87107195 A | 7/1988 |
| CN | 2064363 U | 10/1990 |
| CN | 2139121 Y | 7/1993 |
| CN | 1092457 A | 9/1994 |
| CN | 1255528 A | 6/2000 |
| CN | 1270983 A | 10/2000 |
| CN | 2528771 Y | 2/2002 |
| CN | 1358822 A | 7/2002 |
| CN | 2521473 Y | 11/2002 |
| CN | 1468364 A | 1/2004 |
| CN | 1527872 A | 9/2004 |
| CN | 2668641 | 1/2005 |
| CN | 1957204 A | 5/2007 |
| CN | 101037603 A | 9/2007 |
| CN | 101058731 A | 10/2007 |
| CN | 101157874 A | 4/2008 |
| CN | 201121178 Y | 9/2008 |
| CN | 101395248 A | 3/2009 |
| CN | 100510004 C | 7/2009 |
| CN | 101486017 A | 7/2009 |
| CN | 201264981 Y | 7/2009 |
| CN | 101497835 A | 8/2009 |
| CN | 101509427 A | 8/2009 |
| CN | 101886466 A | 11/2010 |
| CN | 102155300 A | 8/2011 |
| CN | 2509188 Y | 11/2011 |
| CN | 202226816 | 5/2012 |
| CN | 202265541 U | 6/2012 |
| CN | 102584294 A | 7/2012 |
| CN | 202415446 U | 9/2012 |
| CN | 103468289 A | 12/2013 |
| CN | 203425686 U * | 2/2014 |
| CN | 203954884 U * | 11/2014 |
| CN | 203981700 U | 12/2014 |
| CN | 105189704 A | 12/2015 |
| CN | 205650033 U * | 10/2016 |
| CN | 106661456 A | 5/2017 |
| CN | 107445633 A | 12/2017 |
| CN | 208049704 U * | 11/2018 |
| CN | 100500619 C | 6/2020 |
| DE | 201729 C | 9/1908 |
| DE | 212176 | 7/1909 |
| DE | 1212037 B | 3/1966 |
| DE | 3231697 C1 | 1/1984 |
| DE | 3328702 A1 | 2/1984 |
| DE | 3315738 C2 | 3/1984 |
| DE | 3329367 C | 11/1984 |
| DE | 3407487 C1 | 6/1985 |
| DE | 19545736 | 6/1997 |
| DE | 19803455 | 8/1999 |
| DE | 10122531 A1 | 11/2002 |
| DE | 10154785 | 5/2003 |
| DE | 102005015301 | 10/2006 |
| DE | 102006004669 | 8/2007 |
| DE | 102006026521 | 12/2007 |
| DE | 102009031436 | 1/2011 |
| DE | 102011052785 | 12/2012 |
| EP | 0126399 A1 | 11/1984 |
| EP | 0208490 | 1/1987 |

(56) References Cited

FOREIGN PATENT DOCUMENTS

| | | |
|---|---|---|
| EP | 0903393 A2 | 3/1999 |
| EP | 1538503 A1 | 6/2005 |
| EP | 2295129 | 3/2011 |
| EP | 2468837 A1 | 6/2012 |
| FR | 2339664 | 8/1977 |
| GB | 364236 A | 1/1932 |
| GB | 368649 A | 3/1932 |
| GB | 441784 | 1/1936 |
| GB | 606340 | 8/1948 |
| GB | 611524 | 11/1948 |
| GB | 725865 | 3/1955 |
| GB | 871094 | 6/1961 |
| GB | 923205 A | 5/1963 |
| JP | S50148405 | 12/1975 |
| JP | S5319301 A | 2/1978 |
| JP | 54054101 | 4/1979 |
| JP | S5453103 A | 4/1979 |
| JP | 57051786 | 3/1982 |
| JP | 57051787 | 3/1982 |
| JP | 57083585 | 5/1982 |
| JP | 57090092 | 6/1982 |
| JP | S57172978 A | 10/1982 |
| JP | 58091788 | 5/1983 |
| JP | 59051978 | 3/1984 |
| JP | 59053589 | 3/1984 |
| JP | 59071388 | 4/1984 |
| JP | 59108083 | 6/1984 |
| JP | 59145281 | 8/1984 |
| JP | 60004588 | 1/1985 |
| JP | 61106690 | 5/1986 |
| JP | 62011794 | 1/1987 |
| JP | 62285980 | 12/1987 |
| JP | 01103694 | 4/1989 |
| JP | 01249886 | 10/1989 |
| JP | H0319127 | 3/1991 |
| JP | 03197588 | 8/1991 |
| JP | 04159392 | 6/1992 |
| JP | H04178494 A | 6/1992 |
| JP | H05230466 A | 9/1993 |
| JP | H0649450 A | 2/1994 |
| JP | H0654753 U | 7/1994 |
| JP | H06264062 | 9/1994 |
| JP | H06299156 A | 10/1994 |
| JP | 07188668 | 7/1995 |
| JP | 07216357 | 8/1995 |
| JP | H07204432 | 8/1995 |
| JP | H08104875 A | 4/1996 |
| JP | 08127778 | 5/1996 |
| JP | H10273672 A | 10/1998 |
| JP | H11-131074 | 5/1999 |
| JP | 2000204373 A | 7/2000 |
| JP | 2000219883 A | 8/2000 |
| JP | 2001055576 A | 2/2001 |
| JP | 2001200258 | 7/2001 |
| JP | 2002097472 A | 4/2002 |
| JP | 2002106941 | 4/2002 |
| JP | 2003041258 | 2/2003 |
| JP | 2003071313 A | 3/2003 |
| JP | 2003292968 A | 10/2003 |
| JP | 2003342581 A | 12/2003 |
| JP | 2005503448 A | 2/2005 |
| JP | 2005154597 A | 6/2005 |
| JP | 2005263983 A | 9/2005 |
| JP | 2005344085 A | 12/2005 |
| JP | 2006188608 A | 7/2006 |
| JP | 2007063420 A | 3/2007 |
| JP | 4101226 B2 | 6/2008 |
| JP | 2008231278 A | 10/2008 |
| JP | 2009019106 A | 1/2009 |
| JP | 2009073864 A | 4/2009 |
| JP | 2009073865 A | 4/2009 |
| JP | 2009144121 | 7/2009 |
| JP | 2010229239 A | 10/2010 |
| JP | 2010248389 A | 11/2010 |
| JP | 2011504947 A | 2/2011 |
| JP | 2011068733 A | 4/2011 |
| JP | 2011102351 A | 5/2011 |
| JP | 2012102302 | 5/2012 |
| JP | 2013006957 A | 1/2013 |
| JP | 2013510910 | 3/2013 |
| JP | 2013189322 A | 9/2013 |
| JP | 2014040502 A | 3/2014 |
| JP | 2015094091 A | 5/2015 |
| JP | 2016169897 A | 9/2016 |
| KR | 1019960008754 | 10/1996 |
| KR | 19990017156 U | 5/1999 |
| KR | 1019990054426 | 7/1999 |
| KR | 20000042375 A | 7/2000 |
| KR | 100296700 B1 | 10/2001 |
| KR | 20030012458 A | 2/2003 |
| KR | 1020050053861 A | 6/2005 |
| KR | 20060132336 A | 12/2006 |
| KR | 100737393 B1 | 7/2007 |
| KR | 100797852 | 1/2008 |
| KR | 20080069170 A | 7/2008 |
| KR | 20110010452 A | 2/2011 |
| KR | 101314288 | 4/2011 |
| KR | 20120033091 A | 4/2012 |
| KR | 20130050807 | 5/2013 |
| KR | 101318388 | 10/2013 |
| KR | 20140042526 A | 4/2014 |
| KR | 20150011084 A | 1/2015 |
| KR | 20170038102 A | 4/2017 |
| KR | 20170058808 A | 5/2017 |
| KR | 101862491 B1 | 5/2018 |
| RU | 2083532 C1 | 7/1997 |
| RU | 2441898 C2 | 2/2012 |
| RU | 2493233 C2 | 9/2013 |
| SU | 1535880 A1 | 1/1990 |
| TW | 201241166 A1 | 10/2012 |
| TW | 201245431 A1 | 11/2012 |
| UA | 50580 | 10/2002 |
| WO | WO9012074 | 10/1990 |
| WO | WO9945083 | 9/1999 |
| WO | WO02062922 | 8/2002 |
| WO | WO2005023649 | 3/2005 |
| WO | WO2005115583 | 12/2005 |
| WO | WO2007103649 | 9/2007 |
| WO | WO2008034424 | 3/2008 |
| WO | WO2011000447 | 1/2011 |
| WO | WO2011126043 | 10/2011 |
| WO | WO2012029979 | 3/2012 |
| WO | WO2012031726 | 3/2012 |
| WO | WO2013023872 | 2/2013 |
| WO | WO2010107513 | 9/2013 |
| WO | WO2014021909 | 2/2014 |
| WO | WO2014043667 | 3/2014 |
| WO | WO2014105064 | 7/2014 |
| WO | WO2014153050 | 9/2014 |
| WO | WO2016004106 | 1/2016 |
| WO | WO2016033511 | 3/2016 |

OTHER PUBLICATIONS

U.S. Appl. No. 16/704,689, filed Dec. 5, 2019, West et al.
U.S. Appl. No. 16/729,036, filed Dec. 27, 2019, Quanci et al.
U.S. Appl. No. 16/729,053, filed Dec. 27, 2019, Quanci et at.
U.S. Appl. No. 16/729,057, filed Dec. 27, 2019, Quanci et at.
U.S. Appl. No. 16/729,068, filed Dec. 27, 2019, Quanci et al.
U.S. Appl. No. 16/729,122, filed Dec. 27, 2019, Quanci et al.
U.S. Appl. No. 16/729,129, filed Dec. 27, 2019, Quanci et al.
U.S. Appl. No. 16/729 170, filed Dec. 27, 2019, Quanci et at.
U.S. Appl. No. 16/729,201, filed Dec. 27, 2019, Quanci et al.
U.S. Appl. No. 16/729,212, filed Dec. 27, 2019, Quanci et at.
U.S. Appl. No. 16/729,219, filed Dec. 27, 2019, Quanci et at.
U.S. Appl. No. 16/735,103, filed Jan. 6, 2020, Quanci et al.
ASTM D5341-99(2010)e1, Standard Test Method for Measuring Coke Reactivity Index (CRI) and Coke Strength After Reaction (CSR), ASTM International, West Conshohocken, PA, 2010.
Astrom, et al., "Feedback Systems: An Introduction for Scientists and Engineers," Sep. 16, 2006, available on line at http://people/duke.edu/~hpgavin/SystemID/References/Astrom-Feedback-2006.pdf ; 404 pages.

(56) References Cited

OTHER PUBLICATIONS

Basset et al., "Calculation of steady flow pressure loss coefficients for pipe junctions," Proc Instn Mech Engrs., vol. 215, Part C, p. 861-881 IMechIE 2001.
Beckman et al., "Possibilities and limits of cutting back coking plant output," Stahl Und Eisen, Verlag Stahleisen, Dusseldorf, DE, vol. 130, No. 8, Aug. 16, 2010, pp. 57-67.
Bloom, et al., "Modular cast block—The future of coke oven repairs," Iron & Steel Technol, AIST, Warrendale, PA, vol. 4, No. 3, Mar. 1, 2007, pp. 61-64.
Boyes, Walt. (2003), Instrumentation Reference Book (3rd Edition)—34.7.4.6 Infrared and Thermal Cameras, Elsevier. Online version available at: https://app.knovel.com/hotlink/pdf/id:kt004QMGV6/instrumentation-reference-2/ditigal-video.
Clean coke process: process development studies by USS Engineers and Consultants, Inc., Wisconsin Tech Search, request date Oct. 5, 2011, 17 pages.
"Conveyor Chain Designer Guild", Mar. 27, 2014 (date obtained from wayback machine), Renold.com, Section 4, available online at: http://www.renold/com/upload/renoldswitzerland/conveyor_chain_-_designer_guide.pdf.
Costa, et al., "Edge Effects on the Flow Characteristics in a 90 deg Tee Junction," Transactions of the ASME, Nov. 2006, vol. 128, pp. 1204-1217.
Crelling, et al., "Effects of Weathered Coal on Coking Properties and Coke Quality", Fuel, 1979, vol. 58, Issue 7, pp. 542-546.
Database WPI, Week 199115, Thomson Scientific, Lond, GB; AN 1991-107552.
Diez, et al., "Coal for Metallurgical Coke Production: Predictions of Coke Quality and Future Requirements for Cokemaking", International Journal of Coal Geology, 2002, vol. 50, Issue 1-4, pp. 389-412.
Industrial Furnace Design Handbook, Editor-in-Chief: First Design Institute of First Ministry of Machinery Industry, Beijing: Mechanical Industry Press, pp. 180-183, Oct. 1981.
Joseph, B., "A tutorial on inferential control and its applications," Proceedings of the 1999 American Control Conference (Cat. No. 99CH36251), San Diego, CA, 1999, pp. 3106-3118 vol. 5.
JP 03-197588, Inoue Keizo et al., Method and Equipment for Boring Degassing Hole in Coal Charge in Coke Oven, Japanese Patent (Abstract Only) Aug. 28, 1991.
JP 04-159392, Inoue Keizo et al., Method and Equipment for Opening Hole for Degassing of Coal Charge in Coke Oven, Japanese Patent (Abstract Only) Jun. 2, 1992.
Kerlin, Thomas (1999), Practical Thermocouple Thermometry—1.1 The Thermocouple. ISA. Online version available at https:app.knovel.com/pdf/id:kt007XPTM3/practical-thermocouple/the-thermocouple.
Kochanski et al., "Overview of Uhde Heat Recovery Cokemaking Technology," AISTech Iron and Steel Technology Conference Proceedings, Association for Iron and Steel Technology, U.S., vol. 1, Jan. 1, 2005, pp. 25-32.
Knoerzer et al. "Jewell-Thompson Non-Recovery Cokemaking", Steel Times, Fuel & Metallurgical Journals Ltd. London, GB, vol. 221, No. 4, Apr. 1, 1993, pp. 172-173,184.
Madias, et al., "A review on stamped charging of coals" (2013). Available at https://www.researchgate.net/publication/263887759_A_review_on_stamped_charging_of_coals.
Metallurgical Coke MSDS, ArcelorMittal, May 30, 2011, available online at http://dofasco.arcelormittal.com/-/media/Files/A/Arcelormittal-Canada/material-safety/metallurgical-coke.pdf.
"Middletown Coke Company HRSG Maintenance BACT Analysis Option 1—Individual Spray Quenches Sun Heat Recovery Coke Facility Process Flow Diagram Middletown Coke Company 100 Oven Case #1-24.5 VM", (Sep. 1, 2009), URL: http://web.archive.org/web/20090901042738/http://epa.ohio.gov/portals/27/transfer/ptiApplication/mcc/new/262504.pdf, (Feb. 12, 2016), XP055249803 [X] 1-13 * p. 7 * * pp. 8-11 *.
Practical Technical Manual of Refractories, Baoyu Hu, etc., Beijing: Metallurgical Industry Press, Chapter 6; 2004, 6-30.
Refractories for Ironmaking and Steelmaking: A History of Battles over High Temperatures; Kyoshi Sugita (Japan, Shaolin Zhang), 1995, p. 160, 2004, 2-29.
"Resources and Utilization of Coking Coal in China," Mingxin Shen ed., Chemical Industry Press, first edition, Jan. 2007, pp. 242-243, 247.
Rose, Harold J., "The Selection of Coals for the Manufacture of Coke," American Institute of Mining and Metallurgical Engineers, Feb. 1926, 8 pages.
Waddell, et al., "Heat-Recovery Cokemaking Presentation," Jan. 1999, pp. 1-25.
Walker, et al., "Sun Coke Company's heat recovery cokemaking technology high coke quality and low environmental impact", Revue De Metallurgie—Cahiers D'Informations Techniques, Revue De Metallurgie. Paris, FR, (Mar. 1, 2003), vol. 100, No. 3, ISSN 0035-1563, p. 23.
Westbrook, "Heat-Recovery Cokemaking at Sun Coke," AISE Steel Technology, Pittsburg, PA, vol. 76, No. 1, Jan. 1999, pp. 25-28.
"What is dead-band control," forum post by user "wireaddict" on AllAboutCircuits.com message board, Feb. 8, 2007, accessed Oct. 24, 2018 at https:/forum.allaboutcircuits.com/threads/what-is-dead-band-control.4728/; 8 pages.
Yu et al., "Coke Oven Production Technology," Lianoning Science and Technology Press, first edition, Apr. 2014, pp. 356-358.
U.S. Appl. No. 16/828,448, filed Mar. 24, 2020, Quanci et al.
U.S. Appl. No. 16/845,530, filed Apr. 10, 2020, Quanci et l.
U.S. Appl. No. 16/897,957, filed Jun. 10, 2020, Ball et al.
U.S. Appl. No. 17/076,563, filed Oct. 21, 2020, Crum et al.
International Search Report and Written Opinion for PCT/US2019/068822; dated Apr. 29, 2020; 9 pages.

\* cited by examiner

PARTICULATE DETECTION FOR INDUSTRIAL FACILITIES, AND ASSOCIATED SYSTEMS AND METHODS

CROSS-REFERENCE TO RELATED APPLICATION(S)

This non-provisional patent application claims the benefit of priority to U.S. Provisional Patent Application No. 62/786,284, titled "FILTER LEAK DETECTION FOR INDUSTRIAL FACILITIES, AND ASSOCIATED SYSTEMS AND METHODS" and filed Dec. 28, 2018, which is incorporated by reference herein in its entirety by reference thereto

TECHNICAL FIELD

The present disclosure is generally related to particulate detection for industrial facilities, and associated systems and methods. In particular embodiments, the present disclosure is generally related to collection and/or separation device leak detection for coke manufacturing facilities.

BACKGROUND

Coke is a solid carbon fuel and carbon source used to melt and reduce iron ore in the production of steel. In one process, known as the "Thompson Coking Process," coke is produced by batch feeding pulverized coal to an oven that is sealed and heated to very high temperatures for approximately forty-eight hours under closely-controlled atmospheric conditions. Coking ovens have been used for many years to convert coal into metallurgical coke. During the coking process, finely crushed coal is heated under controlled temperature conditions to devolatilize the coal and form a fused mass of coke having a predetermined porosity and strength. Because the production of coke is a batch process, multiple coke ovens are operated simultaneously.

Figure 1:
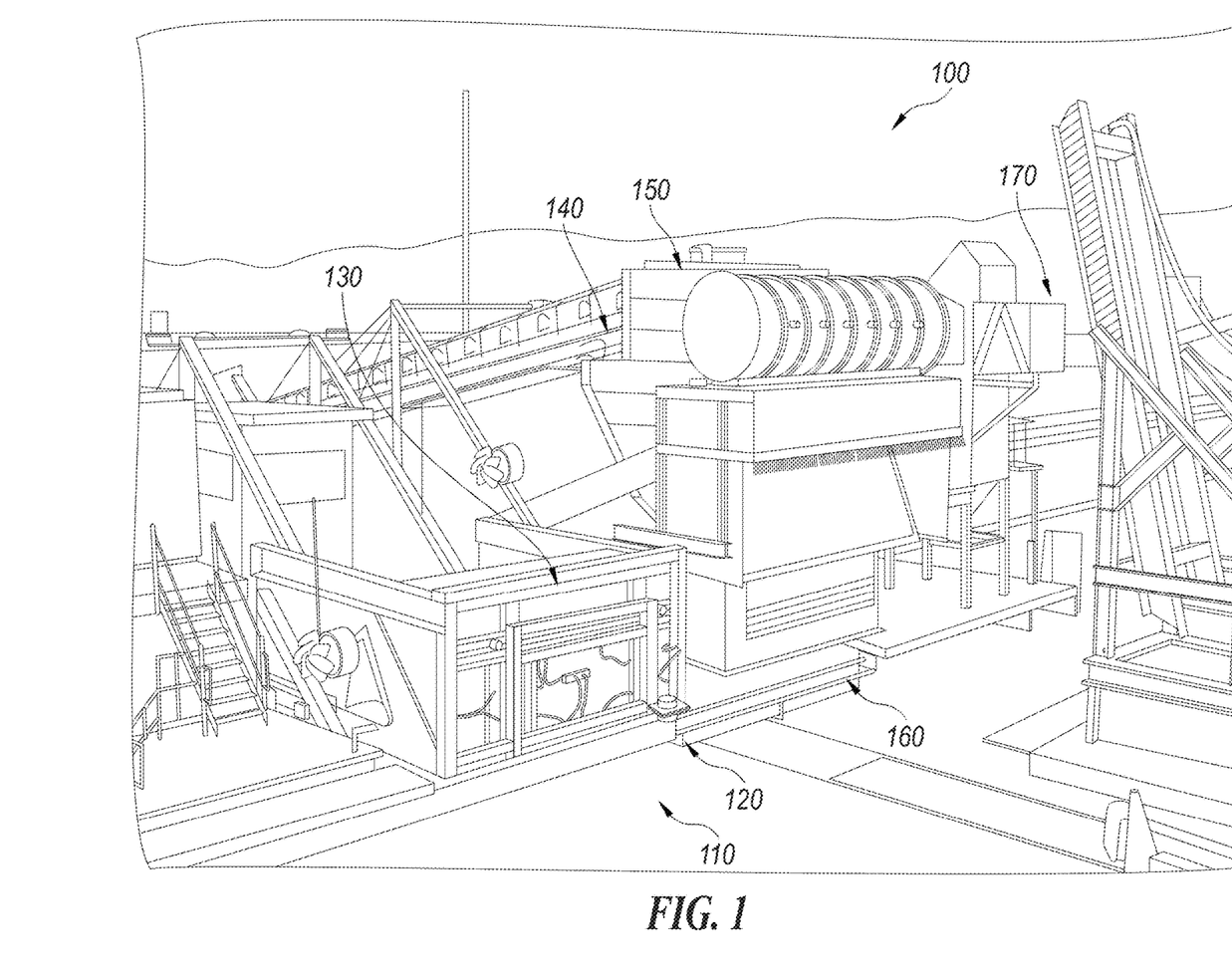
FIG. 1 is an illustration of a pusher charger machine (PCM) used in an industrial facility.

Much of the coke manufacturing process is automated due to the extreme temperatures involved, and a pusher charger machine (PCM) is typically used on the coal side of the oven for a number of different operations. FIG. 1 is an illustration of such a PCM 100 used in a coke manufacturing facility. A common PCM operation sequence begins as the PCM 100 is moved along a set of rails 110 that run in front of an oven battery to an assigned oven and align a coal charging system of the PCM 100 with the oven. The pusher side oven door is removed from the oven using a door extractor 120 from the coal charging system. The PCM 100 is then moved to align a pusher ram 130 of the PCM 100 to the center of the oven. The pusher ram 130 is energized to push coke from the oven interior. The PCM 100 is again moved away from the oven center to align the coal charging system with the oven center. Coal is then delivered to the coal charging system of the PCM 100 by a tripper conveyor 140, which delivers coal to a coal hopper 150. The coal charging system then charges the coal into the oven interior via a charging ram 160. In some systems, particulate matter entrained in hot gas emissions that escape from the oven face are captured by the PCM during the step of charging the coal. In such systems, the particulate matter is drawn into an emissions hood through the baghouse of a dust collector 170. State and/or federal regulations require preventive maintenance to be conducted on the dust collector to maintain compliance. The preventive maintenance often requires using trained "Method 9" personnel and leak detection powder, each of which can make the preventive maintenance difficult.

Accordingly, a need exists for improved methods and equipment for monitoring leak detection for preventive maintenance and so that systems such as the dust collector 170 can stay in compliance with emissions regulations.

DETAILED DESCRIPTION

The present technology relates to a particulate detection system for determining if and when potentially undesirable particulate is present in a given area or region. In some embodiments, the particulate detection system described herein can be used as a leak detection system. For example, when used proximate a separation or collection device, such as a dust collector, the particulate detection system can detect when a leak has occurred. The particulate detection system can provide an indication to plant personnel to remedy an identified issue, such as a leak in a separation or collection device. As explained in more detail below, some embodiments of the present technology include a separation or collection device (e.g., a filter), and a detection device downstream of the separation or collection device and configured to detect particulate released from the separation or collection device (such as via a leak). In some embodiments, the particulate detection system is configured such that released particulate can cause a change in current associated with the detection device, thereby causing the detection device to generate an action, such as the indication to plant personnel.

Specific details of several embodiments of the technology are described below with reference to the Figures. Other details describing well-known structures and systems with which the particulate detection system can be used (e.g., pusher systems, charging systems, and coke ovens) have not been set forth in the following disclosure to avoid unnecessarily obscuring the description of the various embodiments of the technology. Many of the details, dimensions, angles, spatial orientation and other features shown in the Figures are merely illustrative of particular embodiments of the technology. Accordingly, other embodiments can have other details, dimensions, angles, spatial orientation and features without departing from the spirit or scope of the present technology. A person of ordinary skill in the art, therefore, will accordingly understand that the technology may have other embodiments with additional elements, or the technology may have other embodiments without several of the features shown and described below with reference to the Figures.

As noted above, the particulate detection system described herein can be used in conjunction with separation or collection devices to aid in, for example, leak detection in such devices. The particulate detection system described herein can be used with any type of separation or collection device. However, for sake of simplicity, this Detailed Description will describe the disclosed technology as used with a filter and filter system for the purpose of detecting leaks. However, this should not be interpreted as limiting the use of the particulate detection system to filters and for the purpose of detecting leaks. Those of ordinary skill in the art will appreciate that any discussion of a filter or filter described herein can also apply to other separation and collection devices. Similarly, the particulate detection device described herein can be used for a variety of purposes, including leak detection, but also for general particulate detection not specifically linked to a leak.

The technology described herein is applicable to any industry in which leak detection is desired. In some embodiments, the technology described herein is employed in conventional byproduct coke oven batteries for charging, pushing and transporting coke. The technology described herein can be used in, for example, both heat recovery and non-recovery coke oven systems. However, the technology described herein should not interpreted as being limited to these systems.

Figure 2A:
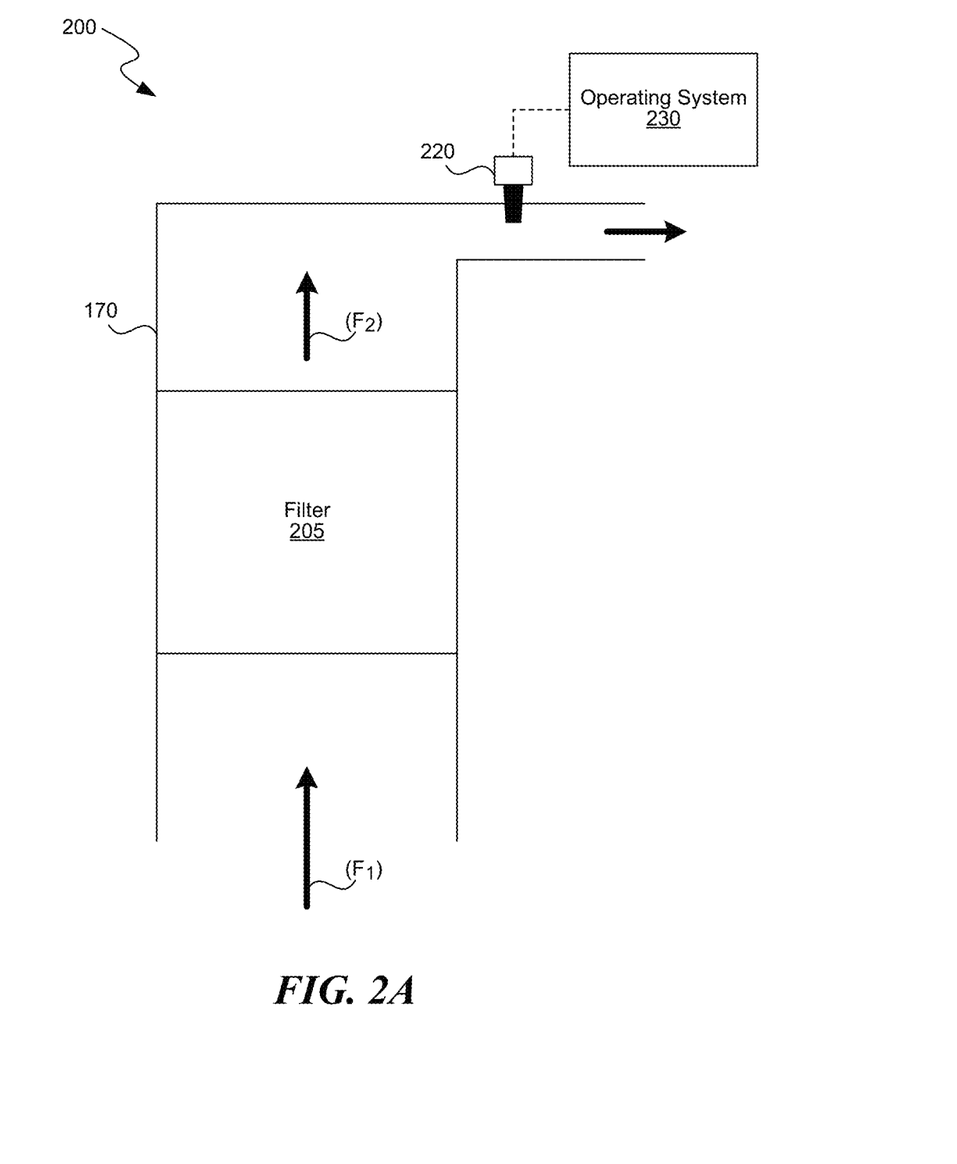
FIG. 2A illustrates a schematic representation of a filter system including a particulate detection device, in accordance with embodiments of the present technology.

FIG. 2A illustrates a schematic representation of a filter system 200, in accordance with embodiments of the present technology. As shown in the illustrated embodiment, the filter system 200 includes the dust collector 170 of a PCM (such as PCM 100 shown in FIG. 1), a filter 205, a particulate detection device 220 downstream of the filter 205, and an operating system 230 in electrical communication with the detection device 220. The filter 205 can include a baghouse, a multiclone, a flat car dust removal system, or other device/system known in the art for collecting particulate matter in an industrial facility or separating particulate from a stream. The filter 205 is configured to receive and filter an inlet stream ($F_1$) comprising particulate (e.g., coal dust, coke dust, general dust, aerosol, steam particulate, etc.) to produce a filtered, outlet stream ($F_2$).

Figure 2B:
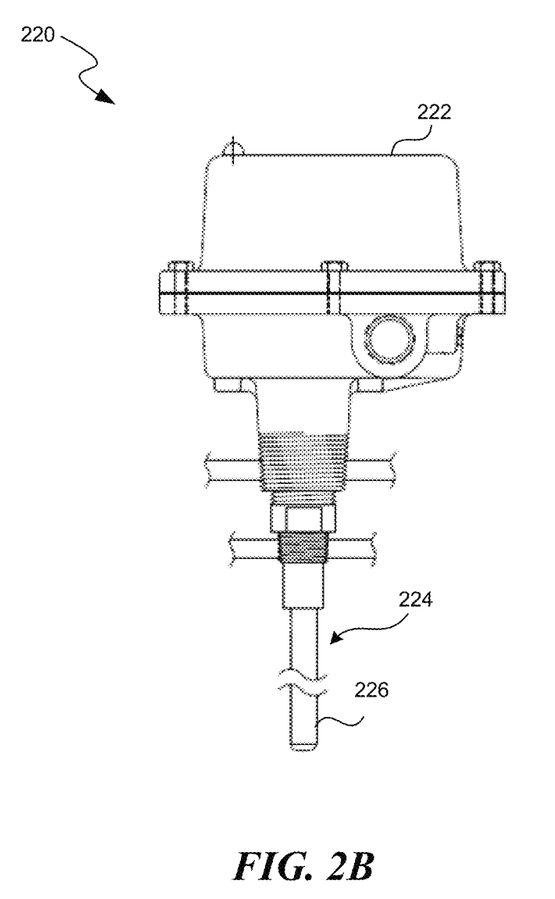
FIG. 2B illustrates a partially-schematic representation of the particulate detection device shown in FIG. 2A.

FIG. 2B illustrates a partially-schematic representation of the particulate detection device 220 shown in FIG. 2A. As shown in the illustrated embodiment, the detection device 220 includes a housing portion 222 containing electronics of the detection device 200, and a probe portion 224 attached to the housing portion 222. The probe portion 224 includes a sensor 226 (e.g., an elongate sensing portion) configured to extend through a vessel/duct wall and be in proximity to particulate traveling through the filter system 200. In some embodiments, the detection device 220 can be the Flo-Guard™ Broken Bag Detector device manufactured by Genuine Bindicator® of Spartanburg, S.C.

Referring back to FIG. 2A, the operating system 230 can include a monitoring or control system. In some embodiments, the operating system 230 is in communication with other equipment that can be moved, adjusted, initiated, etc., in response to communication from the operating system 230. In some embodiments where the technology described herein is used in conjunction with a coke manufacturing facility, the operating system 230 can be in communication with the charging ram 160 (FIG. 1) and used to control movement of the charging ram 160 into and out of the coke ovens. The operating system 230 can also be used to control and is in communication with the conveyer system 140 (FIG. 1). In these embodiments, the operating system 230 allows operators to control aspects of the PCM from a remote location.

Many embodiments of the operating system 230 may take the form of computer-executable instructions, including routines executed by a programmable computer. The operating system 230 may, for example, also include a combination of supervisory control and data acquisition (SCADA) systems, distributed control systems (DCS), programmable logic controllers (PLC), control devices, and processors configured to process computer-executable instructions. Those skilled in the relevant art will appreciate that the technology can be practiced on computer systems other than those described herein. The technology can be embodied in a special-purpose computer or data processor that is specifically programmed, configured or constructed to perform one or more of the computer-executable instructions described below. Accordingly, the terms "operating system" and "computer" as generally used herein refer to any data processor. Information handled by these computers can be presented at any suitable display medium, including a CRT display or LCD. The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of particular embodiments of the disclosed technology.

Referring again to FIG. 2A, the detection device 220 and operating system 230 in operation are configured to detect a leak in the filter 205, and notify plant personnel of the leak. As described in more detail below with reference to FIG. 5, when a leak occurs in the filter 205, particulate will be released into the outlet stream ($F_2$) and detected by the detection device 220. In some embodiments, and as described in greater detail below, the released particulate will cause a change in current experienced by the detection device 220, which in some embodiments will cause it to generate an action (e.g., an indication or alarm). While FIG. 2A illustrates a single detection device 220, it should be appreciated that multiple detection devices can also be provided downstream of the filter 205, each of which can be connected to a common operating system 230, each of which may have its own dedicated operating system, or a plurality of which can be connected to a first common operating system 230 while a plurality of other detection devices 220 not connected to the first common operating system 230 can be connected to a second common operating system 230.

Figure 3:
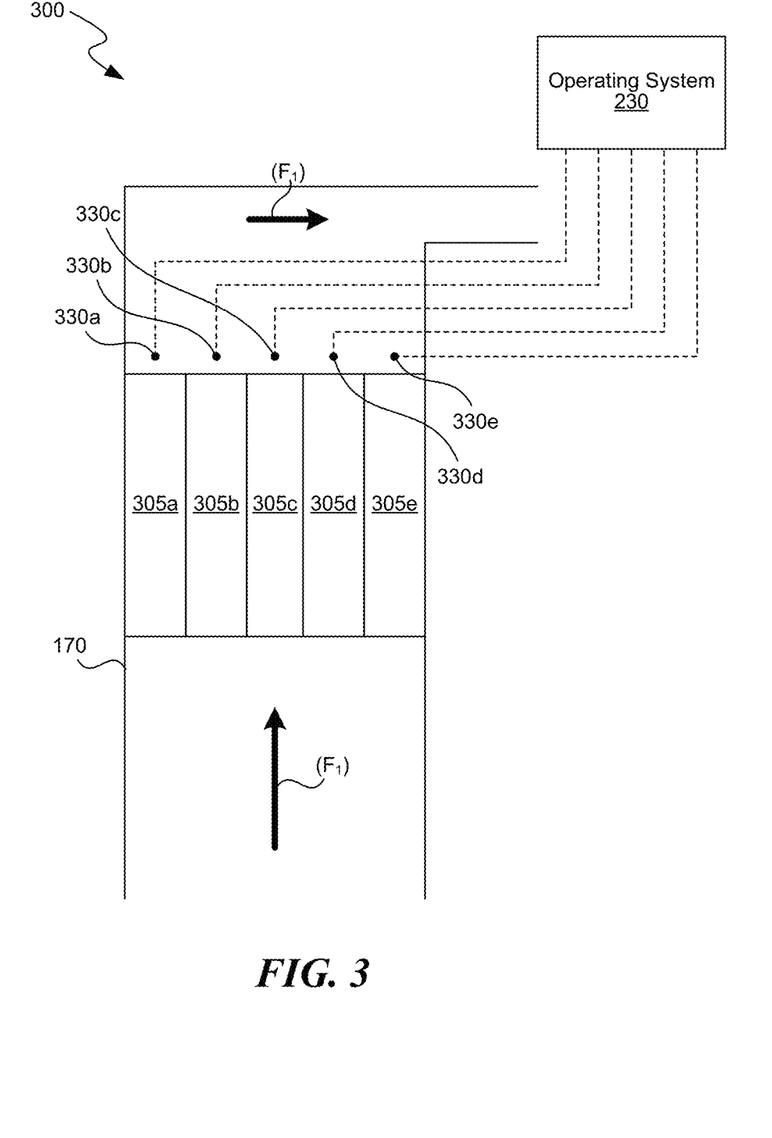
FIG. 3 illustrates a schematic representation of a filter system, in accordance with embodiments of the present technology.

FIG. 3 illustrates a schematic representation of a filter system 300, in accordance with embodiments of the present technology. The filter system 300 includes many features generally similar to those shown and described with reference to filter system 200 (FIG. 2A). The filter system 300 includes a plurality of filters 305a, 305b, 305c, 305d, and 305e (collectively referred to as "filters 305"), and a plurality of detection devices 330a, 330b, 330c, 330d, and 330e. The individual filters 305a-e can correspond to distinct filters or distinct cells within a common filter. Each of the individual detection devices 330a-e are positioned over one of the individual filters 305a-e and in electrical communication with the operating system 230. Accordingly, each of the individual detection devices 330a-e is configured to detect a leak from only the corresponding filter it is positioned over. As such, the filter system 300 is configured to detect when a leak occurs, and indicate which of the plurality of filters 305a-e likely is responsible for the leak.

In operation, detected particulates by the detection device indicates a leak in one or more of the filters. The leak may be caused by a hole or opening in one of the filters, but can also be caused by other factors, such as an incorrect installation of the one of more filters. If the detection device detects particulate immediately after one or more of the filters is put online, the leak may be an indication to the plant personnel that the one or more filters was not installed correctly. In such case, plant personnel may inject colored dust particles toward the one or more filters to determine whether the filters have an opening or are installed incorrectly.

While the particulate detection device has been described herein with respect to positioning the particulate detection device within existing equipment, such as within a filter system, the particulate detection device can also be used in other environments. For example, the particulate detection device described herein can be used in an outside environment, such as proximate but outside of equipment requiring monitoring. Such a configuration allows the detection device to, for example, detect particulate that has escaped from nearby equipment into an outside environment.

Figure 4:
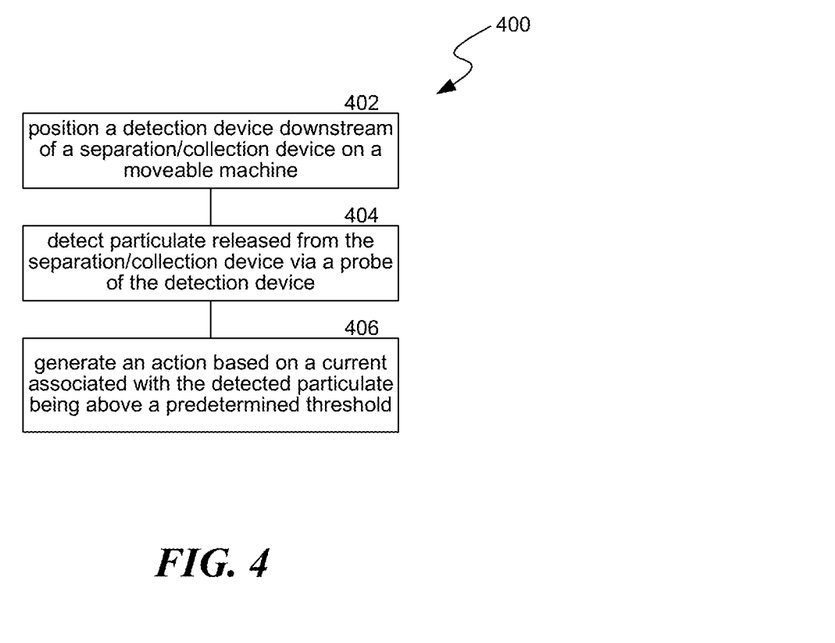
FIG. 4 illustrates a block diagram of a method for detecting particulate in a dust collection system, in accordance with embodiments of the present technology.

The particulate detection device described herein can also be used in a stationary environment (i.e., where the particulate detection device is stationed in a single location and does not move), or in a moving environment, such as on top of moving equipment, machinery, or on vehicles. In examples specific to the coke manufacturing facility, the particulate detection device can be mounted on moving equipment such as a door machine, a quench car, a PCM (pusher charge machine), FPHC (flat push hot car), or it can be mounted on any type of machine, vehicle or truck that navigates around a facility. FIG. 4 discussed below describes a method in which the detection device is mounted on a moveable machine.

FIG. 4 illustrates a block diagram of a method 400 for detecting undesired particulate downstream of a dust collection system, in accordance with embodiments of the present technology. As shown in the illustrated embodiment, the method 400 includes positioning a detection device downstream of a separation or collection device on a movable machine (process portion 402), and detecting particulate via a probe of the detection device (process portion 404). The movable machine can be, for example, a PCM, as previously described with reference to FIG. 1. Detecting the particulate via the probe of the detection device can include detecting a flow of the particulate contacting or in proximity to the sensing portion of the probe. For example, in some embodiments, detecting the flow of particulate can be based on contact between one or more of the particulate and the sensing portion of the probe, which causes a current (e.g., a direct current or an induced current) associated with the probe to exceed a predetermined threshold. In some embodiments, detecting the flow of particulate can be based on particulate being merely proximate to the sensing portion of the probe (e.g., without contacting the probe) such that the sensing portion can detect, e.g., a collective charge of the proximate particulate. In such embodiments, the collective charge causes a current (e.g., a direct current or an induced current) associated with the probe to exceed a predetermined threshold. Other means of detecting particulate can also be used, such as by optical means. For example, the detection device can detect changes in opacity caused by the presence or absence of particulate. As with previous embodiments, detected changes in opacity can cause a current associated with the probe to exceed a predetermined threshold.

The method 400 further comprises generating an action based on a current associated with the detected particulate being above a predetermined threshold (process portion 406). The generated action can comprise activating an indication, such as an audible alarm or illuminated display. The alarm or display can indicate to plant personnel that a potential leak exists and further investigation is needed. In some embodiments, the indication may be, e.g., in an operator's cab of the PCM. In some embodiments, generating the action can be caused by de-energizing or energizing an output relay of the detection device. Other actions that can be generated upon detection of particulate can include an automated maintenance system that automatically engages to correct an identified issue when particulate is identified. Rather than being automatically engaged, detection of particulate can result in a message being sent to an operator requesting that a maintenance system be engaged so that there is human verification and/or authorization prior to initiation.

One advantage of embodiments of the present technology is the ability to detect the presence or flow of particulate on a moveable machine/system. In conventional technologies, detection devices could not be mounted to a moveable machine because the detection devices were sensitive to even minor vibrations, and thus any movement of the detection system or structure to which the detection system was mounted, would result in inaccurate measurements or faulty signals. Accordingly, unlike the present technology, conventional detection devices could not be mounted to moving or moving machines. The present technology overcomes this deficiency of conventional technologies in part because the detection device includes a probe for sensing and does not include wires.

Another advantage of embodiments of the present technology is the ability to provide relatively instantaneous feedback to plant personnel in the event of a leak. Unlike conventional technologies, which required manually checking the filters as a preventive maintenance step, embodiments of the present technology can automatically detect a leak and potentially provide an opportunity to remedy a leak or take appropriate action(s) before a regulatory permit limit is exceeded.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, the terms "vertical," "horizontal," "lateral," "upper," "lower," "above," and "below" can refer to relative directions or positions of features in the semiconductor devices in view of the orientation shown in the Figures. For example, "upper" or "uppermost" can refer to a feature positioned closer to the top of a page than another feature. These terms, however, should be construed broadly to include semiconductor devices having other orientations, such as inverted or inclined orientations where top/bottom, over/under, above/below, up/down, and left/right can be interchanged depending on the orientation.

From the foregoing, it will be appreciated that specific embodiments of the invention have been described herein for purposes of illustration, but that various modifications may be made without deviating from the scope of the invention. For example, Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

We claim:

1. A particulate detection system for use in an industrial facility, comprising:
    a separation or collection device including a baghouse configured to filter particulate from an industrial gas stream including at least one of coal dust or coke dust;
    a detection device downstream of the separation or collection device, wherein the detection device is positioned to detect particulate of the industrial gas stream that passes the separation or collection device, the detection device including a probe configured to detect the particulate,
    wherein the detection device is configured to generate an action when a current associated with the detection device is outside a predetermined range, and
    wherein the separation or collection device and the detection device are positioned on a moveable system, the movable system being a pusher charger machine (PCM) configured to charge a coke oven.

2. The system of claim 1 wherein the current is a direct current, and wherein the probe includes a wireless end portion configured to detect contact with the particulate, thereby causing a change in the direct current.

3. The system of claim 1 wherein the current is a direct current, and wherein the probe includes a wireless end portion configured to detect a collective charge associated with the particulate, thereby causing a change in the direct current.

4. The system of claim 1 wherein the current is an induced current, and wherein the probe includes a wireless end portion configured to detect a collective charge associated with the particulate, thereby causing a change in the induced current.

5. The system of claim 1 wherein the probe is configured to detect flow of the particulate.

6. The system of claim 1, further comprising an operating system operably coupled to the detection device and configured to activate an indication.

7. The system of claim 1 wherein the separation or collection device includes at least one of a baghouse, a multiclone, or a dust collector.

8. The system of claim 1 wherein the detection device is one of a plurality of detection devices, wherein each of the detection devices is mounted to the PCM.

9. The system of claim 1 wherein the separation or collection device is a plurality of filters and the detection device is one of multiple detection devices, wherein each of the filters is positioned upstream of a corresponding one of the multiple detection devices.

10. A method for detecting particulate in an industrial gas facility, comprising:
    positioning a detection device downstream of a separation or collection device configured to filter coal dust or coke dust from an industrial gas stream, wherein the separation or collection device and the detection device are positioned on a moveable pusher charger machine (PCM);
    detecting particulate via a wireless probe of the detection device, the particulate including coal dust, coke dust, or a combination thereof; and
    generating an action based on a current associated with the detected particulate being above a predetermined threshold.

11. The method of claim 10 wherein the wireless probe includes a sensing portion, and wherein detecting the particulate includes detecting a flow of the particulate via the sensing portion of the wireless probe.

12. The method of claim 11 wherein detecting the flow of particulate includes detecting contact between particulate and the sensing portion of the wireless probe, thereby causing a direct current associated with the wireless probe to exceed the predetermined threshold.

13. The method of claim 11 wherein the particulate has a collective charge, and wherein detecting the flow of particulate includes detecting at the sensing portion of the wireless probe the collective charge of the particulate, thereby causing a direct current associated with the wireless probe to exceed the predetermined threshold.

14. The method of claim 11 wherein detecting the flow or presence of particulate includes detecting at the sensing portion of the wireless probe a charge associated with the particulate, thereby causing an induced current associated with the probe to exceed the predetermined threshold.

15. The method of claim 10 wherein generating the action comprises activating an indication.

16. The method of claim 15 wherein the indication includes an audible alarm or an illuminated display.

17. A method for detecting particulate in an industrial gas facility, comprising:
    positioning a detection device downstream of a separation or collection device configured to filter coal dust or coke dust from an industrial gas stream;
    detecting particulate via a wireless probe of the detection device; and
    generating an action based on a current associated with the detected particulate being above a predetermined threshold, wherein generating the action based on the current associated with the detected particulate includes de-energizing an output relay of the detection device to generate an indication.

18. The method of claim 17 wherein the wireless probe includes a sensing portion, and wherein detecting the particulate includes detecting a flow of the particulate via the sensing portion of the wireless probe.

19. The method of claim 18 wherein detecting the flow of particulate includes detecting contact between particulate and the sensing portion of the wireless probe, thereby causing a direct current associated with the wireless probe to exceed the predetermined threshold.

20. The method of claim 18 wherein the particulate has a collective charge, and wherein detecting the flow of particulate includes detecting at the sensing portion of the wireless probe the collective charge of the particulate, thereby causing a direct current associated with the wireless probe to exceed the predetermined threshold.

\* \* \* \* \*

UNITED STATES PATENT AND TRADEMARK OFFICE
CERTIFICATE OF CORRECTION

| | |
|---|---|
| PATENT NO. | : 11,071,935 B2 |
| APPLICATION NO. | : 16/729157 |
| DATED | : July 27, 2021 |
| INVENTOR(S) | : John F. Quanci et al. |

It is certified that error appears in the above-identified patent and that said Letters Patent is hereby corrected as shown below:

In the Specification

In Column 1, Line 14, after "thereto", insert --.--, therefor.
In Column 3, Line 42, delete "200," and insert --220,--, therefor.

Signed and Sealed this
Thirtieth Day of August, 2022

Katherine Kelly Vidal
*Director of the United States Patent and Trademark Office*